United States Patent
Mukherjee et al.

(10) Patent No.: US 10,932,283 B2
(45) Date of Patent: Feb. 23, 2021

(54) WIRELESS COMMUNICATION VIA A FIRST AND A SECOND COMMUNICATION CHANNEL IN A SHARED FREQUENCY BAND

(71) Applicant: Telefonaktiebolaget LM Ericsson (publ), Stockholm (SE)

(72) Inventors: Amitav Mukherjee, Fremont, CA (US); Sorour Falahati, Stockholm (SE); Reem Karaki, Aachen (DE); Havish Koorapaty, Saratoga, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/773,548

(22) PCT Filed: Nov. 4, 2016

(86) PCT No.: PCT/EP2016/076674
§ 371 (c)(1),
(2) Date: May 3, 2018

(87) PCT Pub. No.: WO2017/077034
PCT Pub. Date: May 11, 2017

(65) Prior Publication Data
US 2018/0324828 A1    Nov. 8, 2018

Related U.S. Application Data

(60) Provisional application No. 62/250,611, filed on Nov. 4, 2015.

(51) Int. Cl.
*H04W 72/12*    (2009.01)
*H04L 5/00*    (2006.01)
(Continued)

(52) U.S. Cl.
CPC ....... *H04W 72/1215* (2013.01); *H04L 5/0042* (2013.01); *H04L 5/0094* (2013.01);
(Continued)

(58) Field of Classification Search
CPC ............ H04W 72/1215; H04W 16/14; H04W 74/0808; H04W 74/0816; H04W 88/10; H04L 5/0042; H04L 5/0094
See application file for complete search history.

(56) References Cited

U.S. PATENT DOCUMENTS

| 2011/0286408 A1 | 11/2011 | Flore et al. |
| 2014/0362780 A1 | 12/2014 | Malladi et al. |

(Continued)

FOREIGN PATENT DOCUMENTS

| WO | 2013/068369 A1 | 5/2013 |
| WO | WO 2015/181060 A1 | 12/2015 |

OTHER PUBLICATIONS

Wu (Network Coding for Wireless Networks, Jul. 2007 Technical Report MSR-TR-2007-90), (Year: 2007).*

(Continued)

*Primary Examiner* — Zhensheng Zhang
(74) *Attorney, Agent, or Firm* — Sage Patent Group

(57) ABSTRACT

A method of wireless communication via a first and a second communication channel in a frequency band shared between a first and second radio access technology comprising: a radio network access node distributing data packets for transmission via the first or the second communication channel, the radio network access node transmitting data packets via the first communication channel according to the first radio access technology in said shared frequency band, the radio network access node transmitting data packets via the second communication channel according to the second radio access technology in said shared frequency band, (Continued)

wherein the second radio access technology differs from the first radio access technology.

24 Claims, 14 Drawing Sheets

(51) Int. Cl.
    *H04W 16/14*     (2009.01)
    *H04W 74/08*     (2009.01)
    *H04W 88/10*     (2009.01)

(52) U.S. Cl.
    CPC ....... *H04W 16/14* (2013.01); *H04W 74/0816* (2013.01); *H04W 74/0808* (2013.01); *H04W 88/10* (2013.01)

(56) References Cited

U.S. PATENT DOCUMENTS

| | | | | |
|---|---|---|---|---|
| 2015/0049707 | A1* | 2/2015 | Vajapeyam | H04W 24/10 370/329 |
| 2015/0264726 | A1* | 9/2015 | Zhu | H04W 88/06 370/329 |
| 2016/0073405 | A1* | 3/2016 | Khawer | H04L 5/0007 370/329 |
| 2016/0105858 | A1* | 4/2016 | Damnjanovic | H04W 56/001 370/329 |
| 2016/0128084 | A1* | 5/2016 | Novlan | H04W 72/1268 370/329 |
| 2017/0105233 | A1* | 4/2017 | Zhang | H04W 16/14 |

OTHER PUBLICATIONS

International Search Report and Written Opinion of the International Searching Authority, PCT/EP2016/076674, dated Jan. 30, 2017, 12 pages.

"Remaining Details of the Evaluation Assumptions for LAA," 3GPP TSG RAN WG1, R1-144956, Meeting #79, San Francisco, USA, Nov. 17-21, 2014, Kyocera, (XP050895109), 3 pages.

"IDC Aspects of LAA," 3GPP TSG-RAN WG2, R2-151523, Meeting #89bis, Bratislava, Slovakia, Apr. 20-24, 2015, BlackBerry UK Limited, (XP050936440), 3 pages.

3GPP, Technical Specification Group Radio Access Network; Evolved Universal Terrestrial Radio Access (E-Utra); Radio Resource Control (RRC); Protocol Specification, (Release 12) 3GPP TS 36.331 V12.6.0 (Jun. 2015) 449 pages.

"LTE; Evolved Universal Terrestrial Radio Access (E-UTRA); Physical Channels and Modulation," 3GPP TS 36.211, Version 12.3.0, Release 12 (Oct. 2014), 126 pages.

"LTE; Evolved Universal Terrestrial Radio Access (E-UTRA); Physical Layer Procedures," 3GPP TS 36.213, Version 12.3.0, Release 12 (Oct. 2014), 214 pages.

Examiner Report dated Mar. 19, 2020 for Indian Patent Application No. 201817016798, 6 pages.

Office Action dated Nov. 26, 2020 for European Patent Application No. 16791025.6, 8 pages.

\* cited by examiner

WIRELESS COMMUNICATION VIA A FIRST AND A SECOND COMMUNICATION CHANNEL IN A SHARED FREQUENCY BAND

TECHNICAL FIELD

The present disclosure relates to telecommunications and in particular to methods of wireless communication via a first and a second communication channel in a shared frequency band as well as corresponding computer program products. A radio network access node and a wireless communication device as well as a system comprising the radio network access node and the wireless communication device are also disclosed.

BACKGROUND

The 3rd Generation Partnership Project (3GPP) Rel-13 work item "Licensed-Assisted Access" (LAA) intends to allow LTE (Long Term Evolution) equipment to also operate in the unlicensed 5 GHz (Gigaherz) radio spectrum. This is generally known as LTE-LAA or LTE-U. The unlicensed 5 GHz spectrum is used as a complement to the licensed spectrum. Accordingly, devices connected in the licensed spectrum (also called primary cell (PCell)) may use carrier aggregation to benefit from additional transmission capacity in the unlicensed spectrum (secondary cell (SCell)). To reduce the changes required for aggregating licensed and unlicensed spectrum, the LTE frame timing in the primary cell may simultaneously be used in the secondary cell.

There are also other frequency bands, such as the 3.5 GHz radio spectrum, where wireless communication, e.g. in the form of aggregation of more than one carrier, on the same frequency band is possible, in addition to the frequency bands already widely in use for LTE.

Other examples of such frequency bands include the industrial, scientific and medical (ISM) band in which IEEE 802.11 type networks (generally termed wireless local area networks or WLAN) currently operate, and also what is known as television whitespaces TVWS. These frequency bands may be in simultaneous use by different users operating according to different radio access technologies (RATs), such as evolved universal terrestrial radio access network (E-UTRAN) and WLAN. An example of operating wireless communication devices making use of such shared frequency band(s) is disclosed in international patent publication WO 2013167557 A1. Therein either E-UTRAN (Evolved UMTS (Universal Mobile Telecommunications System) Terrestrial Radio Access) or a WLAN (Wireless Local Area Network) standard is used for data transmissions on unlicensed bands.

SUMMARY

However, due to time-varying traffic loads and a varying number of users employing a single RAT, e.g. LAA-LTE, LTE-U or WLAN, may not make the best use of a shared frequency band. In particular in the case of a radio network access node, such as an eNB (Evolved Node B), that is capable of a first and a second RAT, e.g. LTE, LTE-LAA or standalone LTE-U transmissions and WLAN transmissions (e.g., LAA-LTE or LTE-U small cell with a co-located WLAN Access Point), it is inefficient to use the shared frequency band for transmission of data via one or more communication channels of a single RAT if there is not a high traffic demand or a high number of users. The same is true for a radio network access node non-co-located with a WLAN Access Point but with a backhaul in between the radio network access node and the WLAN Access Point.

According to a first aspect a method of wireless communication via a first and a second communication channel in a frequency band shared between a first and second radio access technology is proposed, the method comprising: a radio network access node distributing data packets for transmission via the first or the second communication channel, the radio network access node transmitting of data packets via the first communication channel according to the first radio access technology in said shared frequency band, the radio network access node transmitting of data packets via the second communication channel according to the second radio access technology in said shared frequency band, wherein the second radio access technology differs from the first radio access technology.

According to a second aspect a method of wireless communication via a first and a second communication channel in a frequency band shared between a first and second radio access technology is proposed, the method comprising: a wireless communication device receiving of data packets via the first communication channel according to the first radio access technology in said shared frequency band, the wireless communication device receiving of data packets via the second communication channel according to the second radio access technology in said shared frequency band, wherein the second radio access technology differs from the first radio access technology, the wireless communication device combining data packets received via the first and the second communication channel.

According to a third aspect a radio network access node for wireless communication via a first and a second communication channel in a frequency band shared between a first and second radio access technology is proposed, the radio network access node operative to: distribute data packets for transmission via the first or the second communication channel, transmit of data packets via the first communication channel according to the first radio access technology in said shared frequency band, transmit data packets via the second communication channel according to the second radio access technology in said shared frequency band, wherein the second radio access technology differs from the first radio access technology.

According to a fourth aspect a wireless communication device for wireless communication via a first and a second communication channel in a frequency band shared between a first and second radio access technology is provided, the wireless communication device operative to receive data packets via the first communication channel according to the first radio access technology in said shared frequency band, the wireless communication device operative to receive data packets via the second communication channel according to the second radio access technology in said shared frequency band, wherein the second radio access technology differs from the first radio access technology, the wireless communication device operative to combine data packets received via the first and the second communication channel.

According to a fifth aspect a computer program product is proposed, comprising program code to be executed by a processor of a radio network access node, thereby configuring the node to operate in accordance with a method according to the first aspect.

According to a sixth aspect a computer program product is proposed, comprising program code to be executed by a processor of a wireless communication device, thereby configuring the wireless communication device to operate in accordance with a method according to the second aspect.

According to a seventh aspect a method of wireless communication via a first and a second communication channel in a frequency band shared between a first and second radio access technology is proposed, the method comprising: a radio network access node distributing data packets for transmission via the first or the second communication channel, the radio network access node initiating transmission of data packets via the first communication channel according to the first radio access technology in said shared frequency band, the radio network access node transmitting of data packets via the second communication channel according to the second radio access technology in said shared frequency band, wherein the second radio access technology differs from the first radio access technology, a wireless communication device receiving the data packets via the first communication channel according to the first radio access technology in said shared frequency band, the wireless communication device receiving data packets via the second communication channel according to the second radio access technology in said shared frequency band, wherein the second radio access technology differs from the first radio access technology, the wireless communication device combining data packets received via the first and the second communication channel.

According to an eighth aspect a system for wireless communication via a first and a second communication channel in a frequency band shared between a first and second radio access technology is proposed, the system comprising a radio network access node according to the third aspect and a wireless communication device according to the fourth aspect.

DETAILED DESCRIPTION

Figure 1:
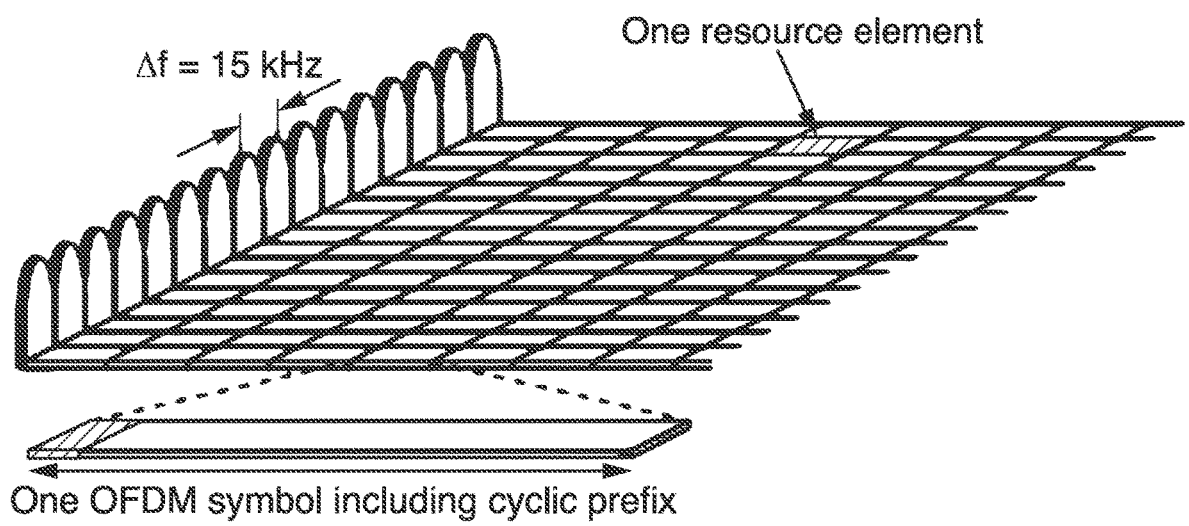
FIG. 1 schematically illustrates the time-frequency grid of downlink physical resources of LTE.

FIG. 1 illustrates the time-frequency grid of downlink physical resources according to LTE. LTE uses OFDM in the downlink and DFT (discrete Fourier transform)-spread OFDM (also referred to as single-carrier FDMA (Frequency Division Multiple Access)) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

Figure 2:
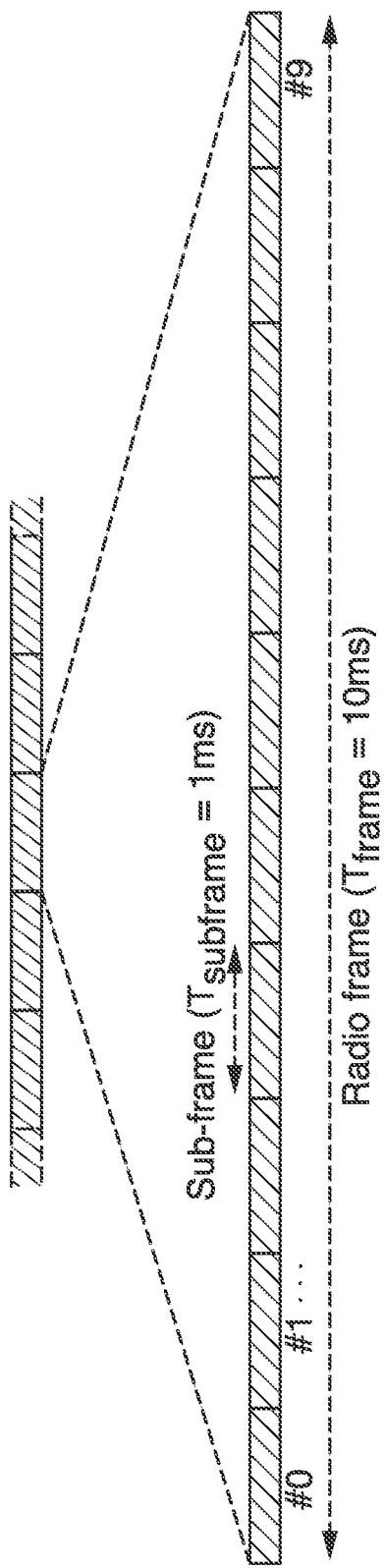
FIG. 2 schematically illustrates the time-domain structure of LTE.

As illustrated in FIG. 2, in the time domain, LTE downlink transmissions are organized into radio frames of 10 ms, each radio frame consisting of ten equally-sized subframes of length Tsubframe=1 ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Figure 3:
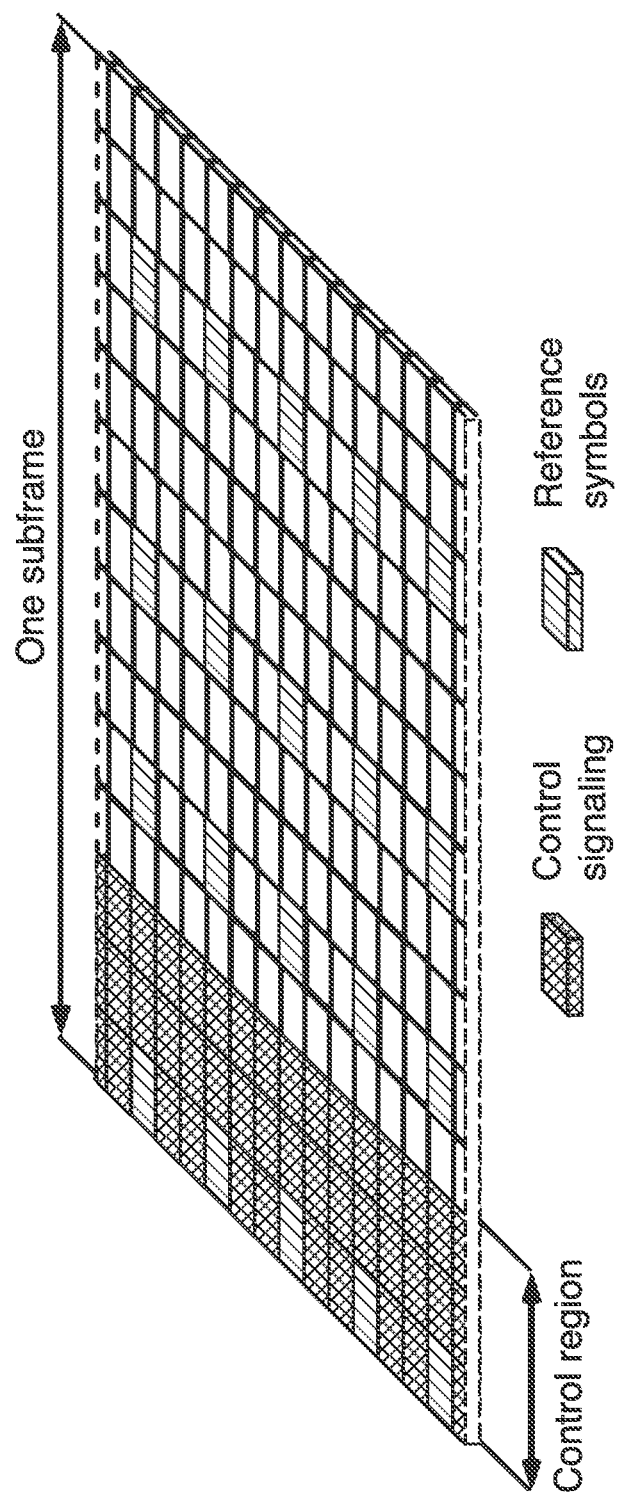
FIG. 3 schematically illustrates a downlink subframe of LTE.

Now referring to FIG. 3, downlink transmissions are dynamically scheduled, i.e. in each subframe a radio network access node, such as a base station, transmits control information about which wireless communication device's data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3.

From LTE Rel-11 onwards, above described resource assignments can also be scheduled on the enhanced Physical Downlink Control Channel (EPDCCH). For Rel-8 to Rel-10 only Physical Downlink Control Channel (PDCCH) is available. The reference symbols shown in FIG. 3 are the cell specific reference symbols (CRS) and are used to support multiple functions including fine time and frequency synchronization and channel estimation for certain transmission modes. In the LTE system, a wireless communication device is notified by the network of downlink data transmission by the physical downlink control channel (PDCCH). Upon reception of a PDCCH in a particular subframe n, a wireless communication device is required to decode the corresponding physical downlink share channel (PDSCH) and to send ACK/NAK (ACKNOWLEDGEMENT/NO ACKNOWLEDGEMENT) feedback in a subsequent subframe n+k. The ACK/NAK feedback informs the radio network access node whether the corresponding PDSCH was decoded correctly. When the radio network access node detects an ACK feedback, it can proceed to send new data blocks to the wireless communication device. When a NAK is detected by the radio network access node, coded bits corresponding to the original data block will be retransmitted. When the retransmission is based on repetition of previously sent coded bits, it is said to be operating in a Chase combining HARQ protocol. When the retransmission contains coded bits unused in previous transmission attempts, it is said to be operating in an incremental redundancy HARQ protocol.

Figure 4:
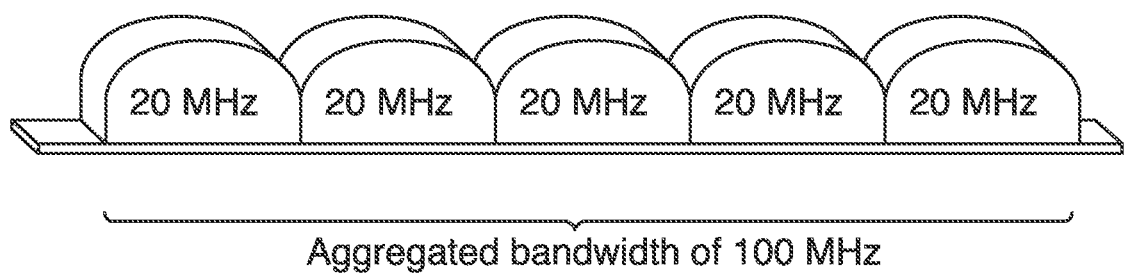
FIG. 4 schematically illustrates an example of carrier aggregation according to LTE.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable wireless communication devices compared to many LTE legacy wireless communication devices. Therefore, it is necessary to assure an efficient use of a wide carrier also for legacy terminals, i.e. that it is possible to implement carriers where legacy wireless communication devices can be scheduled in all parts of the wideband LTE Rel-10 carrier. This may be achieved by means of Carrier Aggregation (CA). CA implies that a LTE Rel-10 wireless communication devices can receive multiple CC, where the CC have, or at least the possibility to have, the same structure as a Rel-8 carrier. CA is illustrated in FIG. 4. A CA-capable wireless communication device is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a wireless communication devices: A wireless communication devices may for example support more downlink CCs than uplink CCs, even though the cell is configured with the same number of uplink and downlink CCs. Each component carrier operates its own individual HARQ instance.

Figure 5:
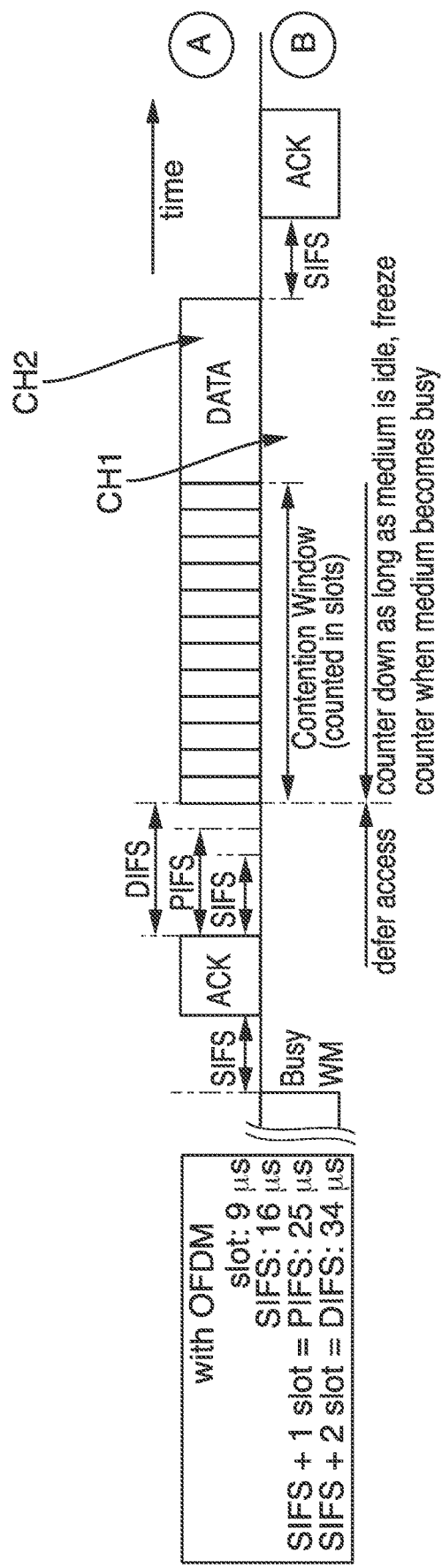
FIG. 5 schematically illustrates an example of a listen-before-talk (LBT) access scheme.

Now turning to FIG. 5, in typical deployments of WLAN a listen-before-talk access-scheme, like carrier sense multiple access with collision avoidance (CSMA/CA), is used for wireless medium access. This means that the channel is sensed to perform a clear channel assessment (CCA), and a transmission is initiated only if the channel is declared as idle. In case the channel is declared as busy, the transmission is essentially deferred until the channel is deemed to be idle. A illustration of the listen before talk (LBT) mechanism of WLAN is shown in FIG. 5. Therein two communication channels CH1, CH2 sharing a wireless medium WM are depicted.

WLAN is an asynchronous access technology that operates on an unlicensed spectrum e.g. with multiple orthogonal channels of contiguous frequency band. In contrast to WLAN, LTE and in particular OFDMA is a synchronous access technology, in which e.g. the subframe timing is synchronized between transmitter and receiver.

In general an asynchronous communication or asynchronous access is transmission of data, without having to synchronize the clock of the receiver and the transmitter, whereas synchronous communication or a synchronous access scheme requires the synchronization between the clocks of the transmitter and the receiver for transmission of data.

In Orthogonal Frequency Division Multiplexing (OFDM) technology based 3GPP Long Term Evolution (LTE) system, two types of timing estimation techniques: time-domain based techniques and frequency-domain based techniques can be used in the receivers during synchronization. When there is little or no frequency error, an efficient timing estimation technique is the correlation technique. With this technique, the receiver in the time domain correlates a known sequence with the received sounding reference signal (SRS) or demodulation reference signal (DRS) that has been modulated by a known sequence.

With regard to FIG. 5, after a WLAN station A transmits a data frame to a station B, station B shall transmit the ACK frame back to station A with a delay of 16 μs—also referred to as SIFS (Short Interframe Space). Such an ACK frame is transmitted by station B without performing a LBT operation. To prevent another station interfering with such an ACK frame transmission, a station shall defer for a duration of 34 μs (referred to as DIFS (DCF (Distributed coordination function) Interframe Space)) after the channel is observed to be occupied before assessing again whether the channel is occupied. Therefore, a station that wishes to transmit first performs a CCA by sensing the medium for a fixed duration DIFS. If the medium is idle then the station assumes that it may take ownership of the medium, e.g. after an additional backoff time, and begin a frame exchange sequence. If the medium is busy, the station waits for the medium to go idle, defers for DIFS, and waits for a further random backoff period. PIFS stands for PCF (Point coordination function) Interframe Space.

In the above basic protocol, when the medium becomes available, multiple WLAN stations may be ready to transmit, which can result in collision. To reduce collisions, stations intending to transmit select a random backoff counter and defer for that number of slot channel idle times. The random backoff counter is selected as a random integer drawn from a uniform distribution over the interval of [0, CW], where CW denotes the Contention Window. The default size of the random backoff contention window, CWmin, is set according to the IEEE specification. Note that collisions can still happen even under this random backoff protocol when there are many stations contending for the channel access. Hence, to avoid recurring collisions, the backoff contention window size CW is doubled whenever the station detects a collision of its transmission up to a limit, CWmax, also set in the according to the IEEE specification. When a station succeeds in a transmission without collision, it resets its random backoff contention window size back to the default value CWmin.

For multi-carrier operation, WLAN follows a hierarchical channel bonding scheme to determine its transmission bandwidth for a frame, which could be 20 MHz, 40 MHz, 80 MHz, or 160 MHz for example. In the 5 GHz band, wider WLAN channel widths of 40 MHz, 80 MHz, 160 MHz or 80+80 MHz are formed by combining contiguous 20 MHz sub-channels in a non-overlapping manner. A pre-determined primary channel performs the CW-based random access procedure after a deferring period if necessary, and then counts down the random number generated. The secondary channels only perform a quick CCA check for a PIFS duration (generally 25 μs) before the potential start of transmission to determine if the additional secondary channels are available for transmission. Based on the results of the secondary CCA check, transmission is performed on the larger bandwidths; otherwise transmission falls back to smaller bandwidths. The WLAN primary channel is always included in all transmissions, i.e., transmission on secondary channels alone is not allowed.

Station A and/or station B may be wireless communication device or a as the case may be a radio network access node.

Also, instead of WLAN another radio network access technology (RAT) may be used for transmission of data (e.g. by way of one or more data packets) employing the Listen-before-talk (LBT) access scheme as described in the above.

Figure 6:
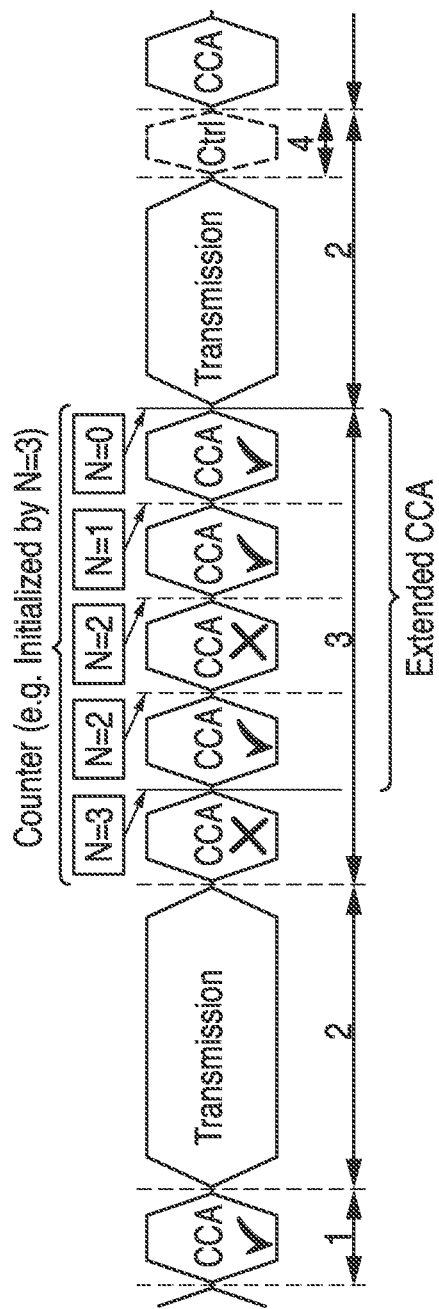
FIG. 6 schematically illustrates another example of a listen-before-talk (LBT) access scheme.

For a wireless communication device not utilizing the WLAN protocol, EN 301.893, v. 1.7.1 provides the following requirements and minimum behavior for the load-based clear channel assessment. The according LBT mechanism is illustrated in FIG. 6:

1) Before a transmission or a burst of transmissions on a communication channel, the transmitter shall perform a Clear Channel Assessment (CCA) check using "energy detect". The equipment shall observe the communication channel(s) for the duration of the CCA observation time which shall be not less than 20 μs. The CCA observation time used by the equipment shall be declared by the manufacturer. The communication channel shall be considered occupied if the energy level in the channel exceeds the threshold corresponding to the power level given below.

2) If the equipment finds the channel to be clear, it may transmit immediately.

3) If the equipment finds a communication channel occupied, it shall not transmit in that channel. The equipment shall perform an extended CCA check in which the communication channel is observed for the duration of a random factor N multiplied by the CCA observation time. N defines the number of clear idle slots resulting in a total Idle Period that need to be observed before initiation of the transmission. The value of N shall be randomly selected in the range 1 . . . q every time an extended CCA is required and the value stored in a counter. The value of q is selected by the manufacturer in the range 4 . . . 32. This selected value shall be declared by the manufacturer. The counter is decremented every time a CCA slot is considered to be "unoccupied". When the counter reaches zero, the equipment may transmit. The total time that an equipment makes use of a communication channel is the Maximum Channel Occupancy Time which shall be less than (13/32)×q ms, with q as defined above, after which the device shall perform the Extended CCA described above.

The receiver, upon correct reception of a packet which was intended for this receiver, can skip CCA and immediately proceed with the transmission of management and control frames (e.g. ACK and Block ACK frames). A consecutive sequence of transmissions by the equipment, without it performing a new CCA, shall not exceed the Maximum Channel Occupancy Time above. For the purpose of multi-cast, the ACK transmissions (associated with the same data packet) of the individual devices are allowed to take place in a sequence.

The energy detection threshold for the CCA shall be proportional to the maximum transmit power (PH) of the transmitter: for a 23 dBm (Decibel milliwatt) e.i.r.p. (equivalent isotropically radiated power) transmitter the CCA threshold level (TL) shall be equal or lower than −73 dBm/MHz at the input to the receiver (assuming a 0 dBi (decibel isotropic) receive antenna). For other transmit power levels, the CCA threshold level TL shall be calculated using the formula: TL=−73 dBm/MHz+23−PH (assuming a 0 dBi receive antenna and PH specified in dBm e.i.r.p.), where PH denotes the maximum transmit power.

Figure 7:
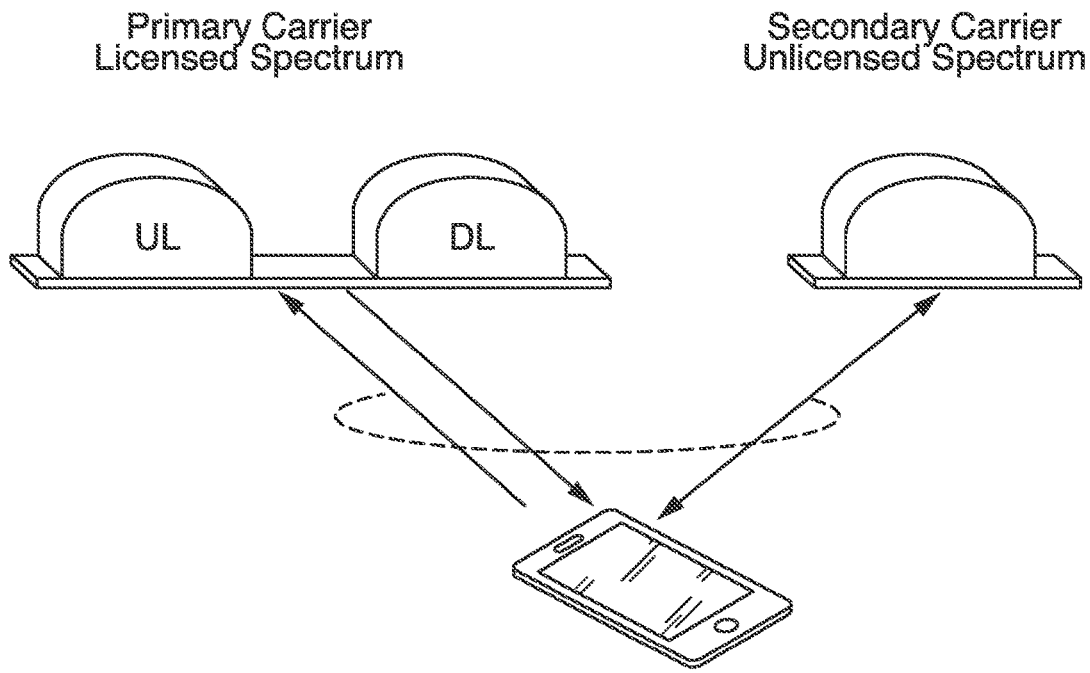
FIG. 7 schematically illustrates an example of carrier aggregation using licensed and unlicensed frequency band(s)

An example of License-Assisted Access (LAA) to an unlicensed frequency band using LTE is illustrated in FIG. 7. The spectrum used by LTE is dedicated to LTE, i.e. the licensed spectrum. This has the advantage that the LTE system does not need to care about the coexistence issue and the spectrum efficiency can be maximized. However, the spectrum allocated to LTE, i.e. the licensed spectrum, is limited and therefore cannot meet the ever increasing demand for larger throughput from applications/services. Therefore, the need has arisen to exploit the unlicensed spectrum in addition to licensed spectrum. Unlicensed spectrum, i.e. unlicensed frequency band, can, by definition, be simultaneously used by multiple different technologies. Therefore, LTE needs to consider the coexistence issue with other systems such as IEEE 802.11 (WLAN). Operating LTE in the same manner in unlicensed spectrum as in licensed spectrum can seriously degrade the performance of WLAN as WLAN will not transmit once it detects the channel is occupied.

Furthermore, one way to utilize the unlicensed spectrum reliably is to transmit essential control signals and channels on a licensed carrier. That is, as shown in FIG. 7 a wireless communication device may connect to a PCell in the licensed band and one or more SCells in the unlicensed band, denoted as Primary Carrier and Secondary Carrier, respectively, in FIG. 7. In this application the secondary cell in unlicensed spectrum is denoted as licensed-assisted access secondary cell (LAA SCell).

The use of LTE carrier aggregation (CA), introduced since Rel-10, offers means to increase the peak data rate, system capacity and user experience by aggregating radio resources from multiple carriers that may reside in the same band or different band. In Rel-13, LAA (Licensed-Assisted Access) has been proposed in order to extend the LTE carrier aggregation feature towards capturing the spectrum opportunities of unlicensed spectrum in the 5 GHz band. WLAN operating in the 5 GHz band nowadays already supports 80 MHz in the field and 160 MHz is to follow in subsequent deployment of IEEE 802.11ac. Enabling the utilization of multi-carrier operation on unlicensed carrier using LAA is deemed necessary as further CA enhancements.

Figure 8A:
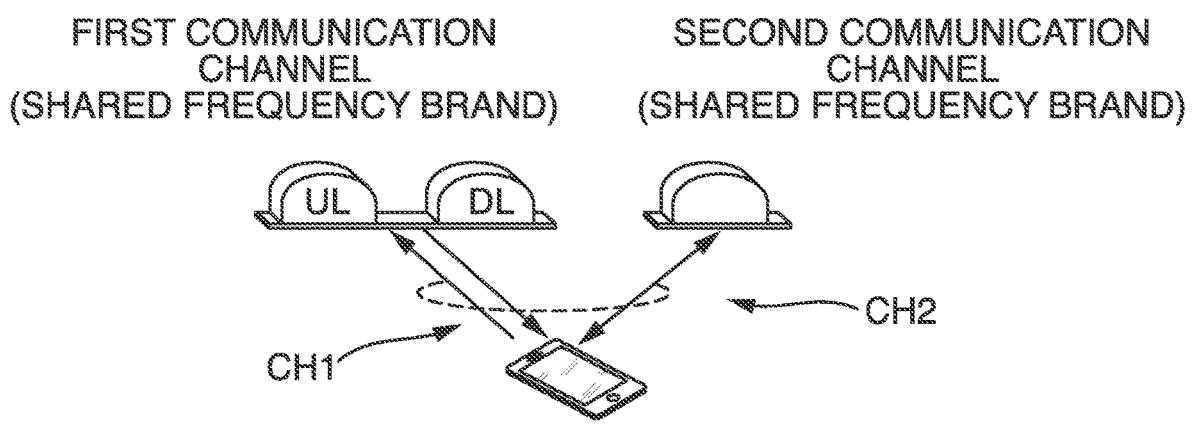
FIG. 8a schematically illustrates an example of channel aggregation using unlicensed frequency band(s) and different RATs.

An example of wireless communication by way of aggregation of a first and a second communication channel in an unlicensed frequency band is illustrated in FIG. 8a. The same advantages as the above mentioned carrier aggregation CA are achieved by of the channel aggregation as disclosed herein. The first and the second RAT between which the (unlicensed) frequency band is shared may only operate on the shared frequency band. However, it is possible that the first RAT may at the same time also be used in a frequency band which the second RAT does not operate on. Also, it may occur that the second RAT is operated on a frequency band or part thereof on which the first RAT is not operated on. Preferably, the first and the second RAT are used in an unlicensed frequency band only. The transmission of data or of one or more data packets using the first RAT may occur via one or more first communication channels. It is to be understood that the uplink (UL) or downlink (DL) data transmission can be regarded as a single first communication channel or as separate first communication channels. Also, the uplink and the downlink transmission of one or more data packets according to the first RAT may be performed using the same or different time and/or frequency resources, i.e. uplink and downlink according to the first RAT may be performed by way of FDD (Frequency Division Duplex) or TDD (Time Division Duplex).

For example said data packets may be PDCP data packets or IP data packets or data packets of any other kind. A data packet may thus be a unit of data made into a single package that travels along a given path. A data packet has other parts besides the raw data it contains—often referred to as the payload.

Figure 10:
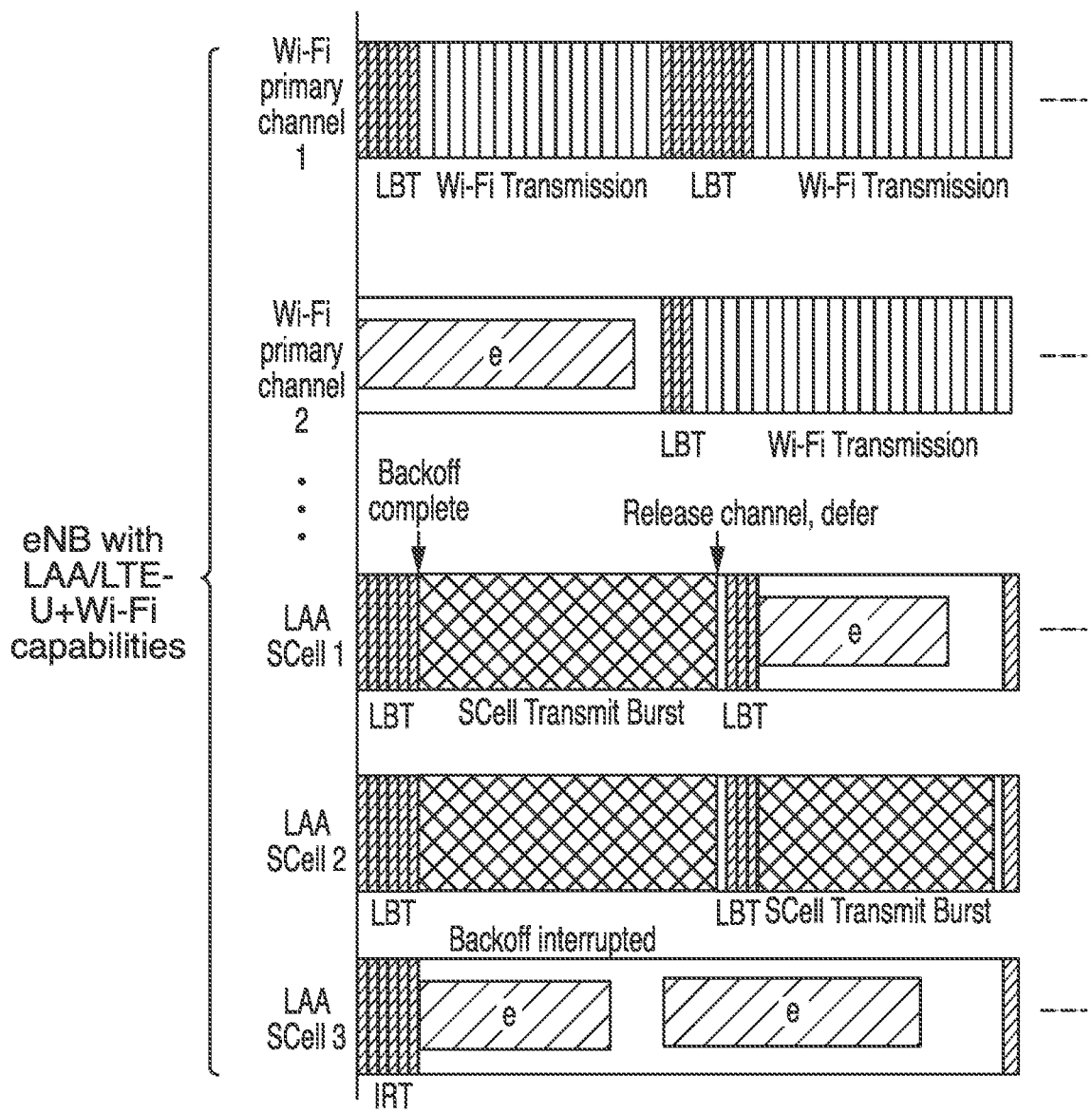
FIG. 10 schematically illustrates an example of a first and a second set of communication channels sharing an unlicensed frequency band, the communication channels cover non-overlapping regions in the frequency-domain.
Figure 11:
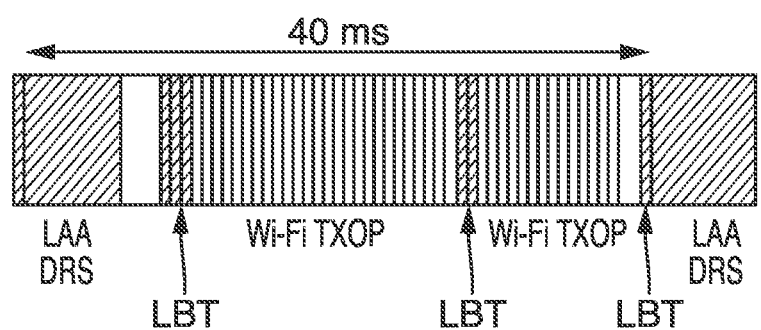
FIG. 11 schematically illustrates an example of a first and a second communication channel sharing an unlicensed frequency band, the second communication channel covering non-overlapping resources in the time-domain.
Figure 12:
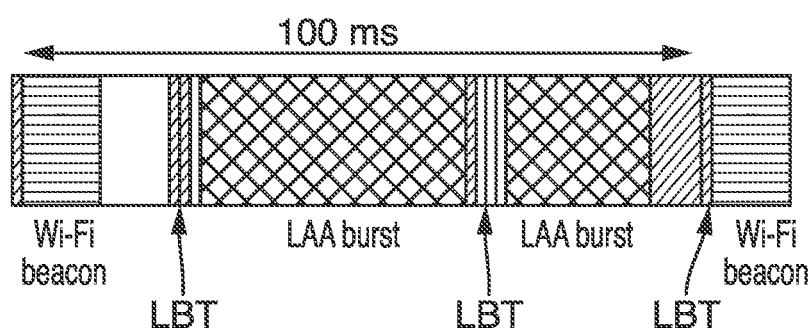
FIG. 12 schematically illustrates another example of a first and a second communication channel sharing an unlicensed frequency band, the second communication channel covering non-overlapping resources in the time-domain.

Additionally to the first communication channel a second RAT may be used to transmit data or one or more data packets via a second communication channel. Both communication channels may be operated in a shared and preferably unlicensed frequency band. Transmission of one or more data packets via the first and the second communication channel may be performed by way of FDM (Frequency Division Multiplexing) and/or TDM (Time Division Multiplexing). FDM transmission is depicted in FIG. 10, whereas a TDD transmission is depicted in FIGS. 11 and 12.

As indicated by the dashed curved line in FIG. 8a wireless communication is performed via the first and the second communication channel, e.g. by aggregation of the first and the second communication channel. That is to say, the first and the second communication channel may be used, in particular by a (single) radio network access node, for example simultaneously or subsequently, for transmission and/or reception of data, e.g. in the form of one or more data packets, preferably to and/or from a (single) wireless communication device.

As the case may be the first communication channel operated according to the first RAT may serve for transmission of one or more data packets to a first wireless communication device whereas the second communication channel operated according to the second RAT may serve for transmission of one or more data packets to another, second wireless communication device. The first communication channel may also serve to transmit data to more than one first wireless communication device. The same is true for the second communication channel. The first and the second communication channel may be operated by a radio network access node in a shared frequency band, in particular an unlicensed frequency band. Preferably the first and the second communication channel are operated exclusively in an unlicensed frequency band.

Figure 8B:
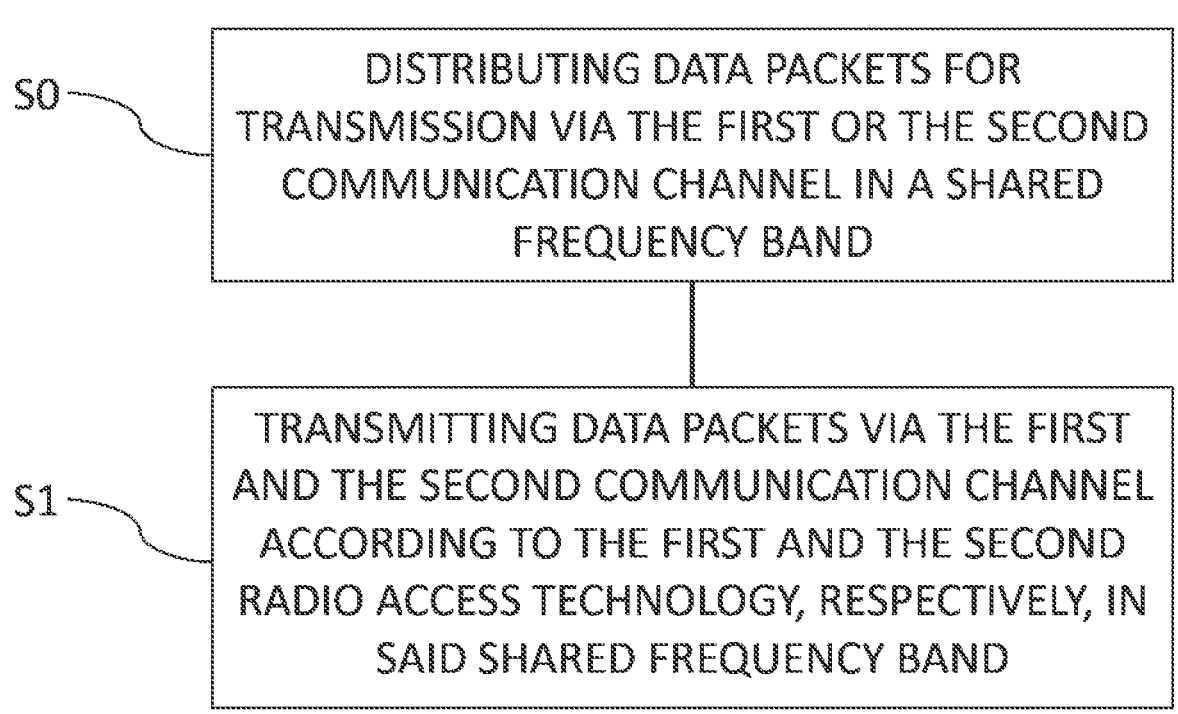
FIG. 8b illustrates a flowchart of a method according to one embodiment.

In FIG. 8b a flowchart of an embodiment, preferably carried out by a radio network access node, is illustrated.

According to the embodiment a method of wireless communication, preferably channel aggregation, of a first and a second communication channel, in a frequency band shared between a first and second radio access technology is proposed.

A radio network access node may receive traffic incoming from another node or a core network or the like. The traffic may be destined for one or more wireless communication devices within a cell or a coverage area served by the radio network access node. Said traffic may comprise one or more kinds of data, e.g. payload data such as multimedia, video, voice etc.

For example, for the purpose of transmitting said data to the one or more wireless communication devices said data may be divided into data packets (if not already present in the form of one or more data packets) which data packets then may be distributed for transmission via the first and the second communication channel. Thus, the data packets are distributed on the first and second communication channel. As the case may be data or data packets destined for a first wireless communication device may be transmitted via the first communication channel, whereas data or data packets destined for a second wireless communication device are transmitted via the second communication channel and may be distribute accordingly. However, the data packets may be transmitted to a single wireless communication device making use of the first and the second communication channel.

Distributing data packets for transmission via the first or the second communication channel in a shared frequency band may be initiated in a step S0, e.g. by a radio network access node, such as an eNodeB.

Subsequently the transmission of data packets via the first and the second communication channel CH1, CH2 according to the first and the second radio access technology, respectively, in said shared frequency band may be initiated in a step S1, e.g. by the same radio network access node.

The shared frequency band preferably is an unlicensed frequency band, e.g. the 5 GHz frequency band. The first radio access technology and said second radio access technology may employ a listen-before-talk access-scheme, e.g. as described in the above. The first RAT may employ a first and the second RAT a second LBT access scheme, which second access scheme is different from the first LBT access scheme.

Different RATs may have different RNC (Radio Network Controller), e.g. also a W-CDMA RNC and a TD-CDMA RNC. For example, a core network connected to the radio network access node may be utilizing an E-UTRAN radio technology and also be in communication with another RAT employing a GSM (Global System for Mobile Communications) radio technology. The different RATs may have different protocols for Medium Access Control MAC and/or the Physical Layer PHY. Examples of different RATs include Bluetooth, Wi-Fi, and 3G, 4G. As multitude of varying radio access technologies are still under development the list of example sis not complete. Different access technologies may have different characteristics: they may differ in their radio coverage, their spectral efficiency, cell capacity, and peak data rate; they can support different services; some support user mobility; they may also differ in their complexity and costs. Different radio access technologies are connected to a common radio bearer gateway (RBG), which is e.g. part of a radio network access node. The radio bearers of the different radio access technologies are all terminated in the same radio bearer gateway.

The most prominent WLAN system is the IEEE 802.11 system, standardised by the institute of electrical and electronics engineers (IEEE). 802.11 systems exist in different flavours 802.11a, 802.11b, 802.11g, of which a and b/g operate in different frequency bands. A new version 802.11n is currently being specified, which provides increased peak-data rates. Another set of RATs are wireless regional area networks also standardised by IEEE802.16, typically denoted as WiMAX3. The IEEE 802.16 standard provides fixed wireless access without support for mobility; the version IEEE 802.16e also supports mobility. All these RATs differ in their characteristics with respect to 1) the frequency band they use, 2) whether the frequency band is licensed or un-licensed, 3) the support for user mobility, 4) the peak data rate, capacity and spectral efficiency, 5) the support for quality of service (QoS), and 6) the complexity and costs.

Different RATs may have different mechanisms for using and sharing their available resources among users. For example, resources can be divided into time slots, frequency subcarriers or codes; they can be allocated in a deterministic fashion or statistically, using contention-based schemes. The notions of the amount of total resources occupied (the load level), and the amount of resources that a particular user session occupies may differ in different RATs.

The first radio access technology RAT1 data may employ a synchronous access scheme, and the second radio access technology RAT2 may employ an asynchronous access scheme.

The radio network access node may simultaneously transmit or initiate transmitting data packets via the first and the second communication channel in said shared frequency band. Thus the shared frequency band is utilized by the radio network access employing the first and the second RAT simultaneously.

The first communication channel may use resources in a first frequency region of the shared frequency band and said second channel may use resources in a second frequency region of the shared frequency band, said first and second frequency region being non-overlapping. The first and the second communication channel may be operated and/or controlled by the radio network access node.

The radio network access node may transmit data packets subsequently via the first and the second communication channel in said shared frequency band. Thus the shared frequency band may be at a first point in time at least partially occupied by a communication channel employing the first RAT only and a second point in time at least partially occupied by a second communication channel employing the second RAT.

The first communication channel may in this embodiment use resources in a first frequency region of the shared frequency band and said second channel using resources in a second frequency region of the shared frequency band, said first and second frequency region being overlapping.

The radio network access node may distribute the data packets for transmission via the first or the second communication channel dependent on at least one of the following:
- a wireless communication device's capability of supporting the first and/or the second of the radio access technologies
- a number of wireless communication devices associated with the radio network access node
- an amount of (un)successful transmission of data packets via the first and/or second radio access technology
- a quality of service metric of the first and/or second radio access technology
- a traffic load distribution associated with the first and/or second radio access technology.

Thus, e.g. data packets may be transmitted via the first communication channel to a wireless communication device capable of the first RAT only and may distribute data packets via the second communication channel to another wireless communication device capable of the second RAT (only). According information and identification about the capabilities of the respective wireless communication device may be communicated to the radio network access node and stored in a data base within the radio network access node or operatively coupled to the radio network access node.

A quality of service (QoS) can be seen in IEEE Std. 802.11e/D6.0, "Part 11: Wireless Medium Access Control (MAC) and physical layer (PHY) specifications: Medium Access Control (MAC) Quality of Service (Qos) Enhancements", November 2003. The QoS may be based on at least one of the following: packet delivery ratio (PDR), delay, jitter, received signal strength information (RSSI), etc. via the first and/or the second communication channel.

The radio network access node may initiate transmission of control information and resource allocation grants for the first communication channel via the second communication channel or vice versa.

Figure 8C:
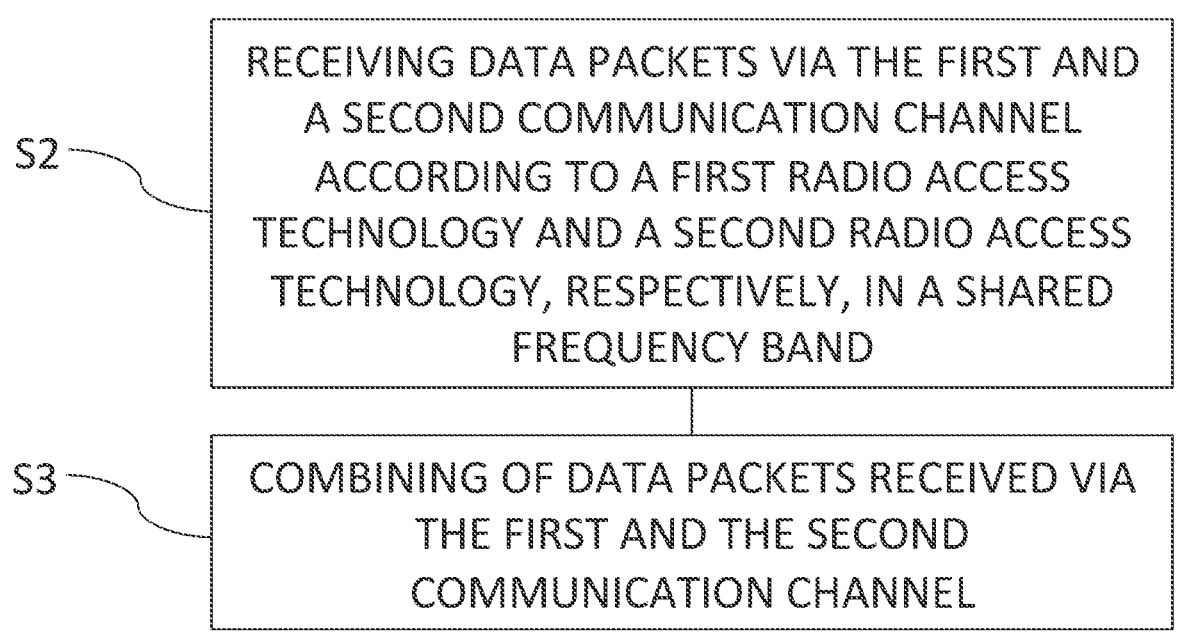
FIG. 8c illustrates a flowchart of a method according to another embodiment.

In FIG. 8c a flowchart of an embodiment, preferably carried out by a wireless communication device, is illustrated.

A method of wireless communication, preferably aggregation of a first and a second communication channel, in a frequency band shared between a first and second radio access technology is proposed, preferably carried out by a wireless communication device. A wireless communication device may for example be an user equipment (UE), a mobile phone, a smartphone, a data modem, a mobile computer, a vehicle or another kind of terminal device.

A wireless communication device may in a step S2 receive of and thus receive data packets via the first communication channel according to the first radio access technology in said shared frequency band. The wireless communication device may in the same step S2 or in a subsequent step receive data packets via the second communication channel according to the second radio access technology in said shared frequency band, wherein the second radio access technology differs from the first radio access technology. The wireless communication device may combine and thus combine data packets received via the first and the second communication channel in a step S3.

The shared frequency band being may be an unlicensed frequency band. The first radio access technology and said second radio access technology may employ a listen-before-talk access-scheme. It is to be understood that a listen-before-talk access-scheme comprises at least any one of the above mentioned examples as CSMA/CA, CSMA/CD etc.

The first radio access technology data may employ a synchronous access scheme, said second radio access technology data may employ an asynchronous access scheme. The wireless communication device may thus be able and possess one or more interfaces in order to decode the data packets received via the first and the second communication channel.

The wireless communication device simultaneously receiving data packets via the first and the second communication channel in said shared frequency band.

The first communication channel using resources in a first frequency region of the shared frequency band and said second channel using resources in a second frequency region of the shared frequency band, said first and second frequency region being non-overlapping.

The wireless communication device may receive subsequently data packets via the first and the second communication channel in said shared frequency band.

The first communication channel may use resources in a first frequency region of the shared frequency band and said second channel using resources in a second frequency region of the shared frequency band, said first and second frequency region being overlapping.

The wireless communication device receiving data packets distributed on the first or the second communication channel dependent on at least one of the following:
- a wireless communication device's capability of supporting the first and/or the second of the radio access technologies
- a number of wireless communication devices associated with the radio network access node an amount of (un)successful transmission of data packets via the first and/or second radio access technology a quality of service metric of the first and/or second radio access technology a traffic load distribution associated with the first and/or second radio access technology.

The wireless communication device may receive control information and resource allocation grants for the first communication channel via the second communication channel or vice versa.

Figure 9:
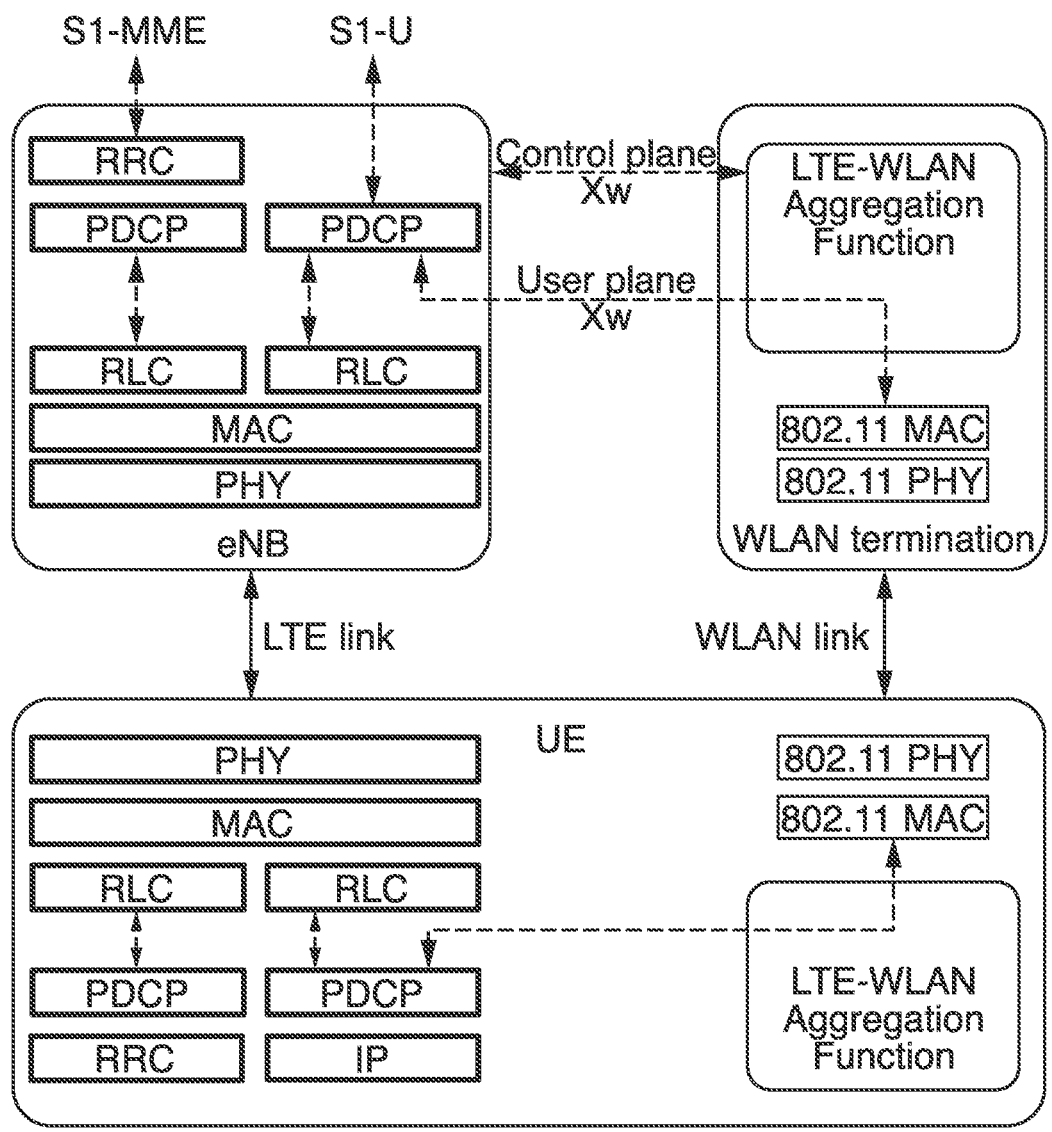
FIG. 9 schematically illustrates an example of LTE-WLAN channel aggregation.

FIG. 9 illustrates an example of wireless communication using an LTE and a WLAN communication channel. Thus the first RAT RAT1 is in the following, just as an example only, LTE, LAA-LTE or LTE-U and the second RAT is, just as an example only, WLAN. The radio network access node may have both LTE eNB and WLAN AP (Access Point) functionality while an interface between eNB and WLAN may be needed for the non-co-located scenario. The architecture of a LTE-WLAN aggregation scenario which may be based on PDCP (Packet Data Convergence Protocol)-level traffic distributing. The Xw interface may be used if the LTE eNB and WLAN AP are non-co-located. The wireless communication device is denoted UE in FIG. 9.

When very wideband operation is feasible in the unlicensed band, a radio network access node may be able to operate both LTE, LAA-LTE, LTE-U and WLAN in parallel, with LTE on a subset of resources in the unlicensed frequency band and WLAN on another subset, i.e. on a first and on a second communication channel CH1, CH2, denoted as LTE link and WLAN link respectively in FIG. 9. The appropriate allocation of communication channels (frequency sharing) between these two technologies is critical for optimal load balancing and mitigation of adjacent channel interference issues. Sharing of the unlicensed spectrum, e.g. between a first radio access technology, e.g. LAA, and a second radio access technology, e.g. WLAN, can be across frequency or across time. For the sake of convenience only LTE is mentioned in the following although LAA-LTE or LTE-U or a first radio access technology in general may be employed instead (if not otherwise indicated). Also, even though WLAN is explicitly mentioned in the following a second radio access technology in general may be employed instead.

This allows improving the efficiency of (wideband) operation in the unlicensed spectrum. Also, data traffic can be quickly served via an alternative RAT if either WLAN or LTE are operating on a congested unlicensed channel. Further on, load-sharing between LTE and WLAN networks with heterogeneous numbers of associated wireless communication devices and traffic loads may be improved.

Examples of time and/or frequency sharing between LTE and WLAN in an unlicensed frequency band are described in FIG. 10 and FIGS. 11 and 12, respectively. These approaches hold for both FDD (Frequency Division Duplex) LTE and TDD (Time Division Duplexing) LTE, and for DL as well as UL transmissions in the unlicensed spectrum. It is to be understood that the proposed methods also apply to different variations of LTE operating in unlicensed spectrum, such as LTE-U and standalone LTE-U.

LTE and WLAN aggregation is a feature where the wireless communication device may receive and transmit using links to both LTE and WLAN. In the split bearer architecture option of LTE-WLAN aggregation in the downlink data is split on the PDCP (Packet Data Convergence Protocol) layer. The radio network access node may distribute PDCP PDUs (Packet Data Units) dynamically via the first and/or the second communication channel to the wireless communication device directly. An adaptation layer (LTE-WLAN Aggregation Function) may be provided in order to adapt PDCP packets to be transported by WLAN.

Although as depicted in FIG. 9 the case may be that both the first and the second communication channel terminate at a single wireless communication device, it is also possible that the first communication channel terminates at a first wireless communication device, whereas the second communication channel terminates at another, second wireless communication device. That is to say the first communication channel is used for communication with a first wireless communication device and the second channel is used for communication with a second wireless communication device, e.g. if the first wireless communication device is capable of the first RAT only and the second wireless communication device is capable of the second RAT only.

Now turning to FIG. 10, an example of aggregation of LTE and WLAN in unlicensed spectrum is provided. It is to be understood that LTE and WLAN (also denoted as Wi-Fi in FIGS. 10, 11, 12) are only considered an example of a first and a second RAT in this case as well.

A radio network access node with both LAA-LTE and WLAN capabilities may aggregate one or more LAA-LTE communication channel and one or more WLAN communication channels in parallel for data transmission. As a non-limiting example, the WLAN channels may be placed in the higher end of the unlicensed 5 GHz band, while the LAA-LTE SCells are placed in the lower end of the unlicensed 5 GHz band. As another example, the LAA-LTE SCells may be placed in the 3.5 GHz band while the WLAN channels are placed in the 5 GHz band. Tight time synchronization is not needed between the WLAN channels and the LAA-LTE SCells. An illustration is given in FIG. 10, which depicts two WLAN primary channels aggregated with three LAA-LTE SCells; LAA-LTE component carriers on licensed spectrum are not shown explicitly. The radio network access node may distribute data flows, e.g. at the PDCP layer, such that LAA-LTE and WLAN have independent RLC (if applicable), MAC and/or PHY layers at the radio network access node. The LTE, LAA-LTE or LTE-U and WLAN radio interfaces of the radio network access node may not be co-located, in which case an Xw interface, which e.g. serves as a backhaul, is needed between the radio network access node and the access point AP.

The CCA durations and LBT procedures followed by the WLAN and LTE channels may be different. Depending upon the frequency separation of the WLAN and LTE channels, the LBT procedure for WLAN channels may either be performed while transmissions are taking place on one or more LTE SCells, or they may be deferred until the end of the LTE SCell transmission, (and vice versa). A LTE (DRS) transmission is also denoted as burst in the following and in FIGS. 10 and 12.

The LBT procedure may be viable since there may interferer in the shared and/or unlicensed frequency band, e.g. because of data transmission in channels not operated by the same radio network access node.

The radio network access node may be equipped with an additional control unit that can optimize and dynamically vary the channel allocation between WLAN and LTE by activating/deactivating LTE SCells and controlling which unlicensed channels are designated as WLAN primary channels. These decisions may be based upon numbers of associated wireless communication devices of different capabilities, LBT success/failure rate of each RAT, and relative traffic loads and QoS classes of traffic for each RAT. Furthermore, the radio network access node may be able to send control information and resource allocation grants corresponding to one RAT via the downlink transmissions of the other RAT.

In one example application, both LTE and WLAN channels are used to serve traffic to a common set of wireless communication devices that are capable of simultaneous reception on LTE and WLAN radios. Such wireless communication devices may have independent LTE and WLAN PHY, MAC, and RLC layers (if applicable), and a common PDCP layer.

In another example application, the WLAN channels may serve traffic to a combination of wireless communication devices with only WLAN capabilities and wireless communication devices that can switch between LTE and WLAN or can receive simultaneously on LTE and WLAN radios. Similarly, the LTE SCells may serve traffic, e.g. in the form of data packets, to a combination of LTE-only wireless communication devices and wireless communication devices that can receive simultaneously on LAA and WLAN radios.

In the second aspect of this embodiment, the aggregation of LTE and WLAN channels is performed by a wireless communication device for the purposes of UL data transmissions to a single radio network access node. The operation may be based on principles similar to those presented for the DL case above. In an additional aspect, control and feedback information corresponding to one RAT may be sent by the wireless communication device on another RAT. Examples of such feedback include CSI feedback and HARQ ACK/NACK information. In yet another aspect, dynamic power sharing may be performed between LTE SCells and WLAN channels, based on the number of unlicensed carriers that are currently active.

Now turning to FIG. 11, an example of time sharing between LTE and WLAN is provided. Time sharing is performed between LTE transmissions and WLAN transmissions on the same unlicensed frequency band or set of adjacent communication channels in said unlicensed frequency band. Non-limiting examples include the same 20 MHz channel, or set of adjacent channels that span 40 MHz, 60 MHz, 80 MHz, or 160 MHz. The basic principle is to intersperse data transmission of one RAT in between periodic or near-periodic management and/or control transmissions of another RAT, with some or all such transmissions being subject to LBT.

The first time-sharing example is shown in FIG. 11, where WLAN transmissions are performed in between periodic transmissions of LTE discovery reference signals (DRS). If the traffic load of LTE wireless communication devices is low and/or most LTE wireless communication devices are in DRX, the idle time is used opportunistically for WLAN DL transmissions to WLAN STAs. Some guard time may be needed between the end/start of DRS transmission and the start/end of WLAN transmissions by the eNB in order to activate and configure the different radio interfaces. The WLAN TXOP (Transmit Opportunity) may be shared between DL and UL bursts, and the duration of certain WLAN TXOPs may be limited by the need to send the next LTE DRS burst. In order to opportunistically transmit WLAN TXOPs, periodic transmission of WLAN beacons is also needed but is not shown explicitly in FIG. 11.

The second time-sharing example is shown in FIG. 12, where LTE transmissions are performed in between periodic transmissions of WLAN beacon frames or WLAN another management frame. If the traffic load of LTE wireless communication devices is low and/or most WLAN wireless communication devices are in power-saving mode, the idle time may be used for LTE DL transmissions to wireless communication devices. The LTE bursts may be shared between DL and UL transmissions. It is further noted that the examples of FIG. 10 and FIG. 12 may be operated together.

When LTE bursts and WLAN TXOPs are time-shared, different LBT parameters such as contention window size and defer period can be applied for different LTE bursts as well as WLAN TXOPs. The LBT parameters may depend on the QoS of the transmitting signal as well as the type of signal being for example data or control signaling, etc. Moreover, the LBT parameters can be adjusted based on a trigger mechanism for consecutive LBT attempts. For example, the triggering mechanism could be based on success or failure of the transmission. As an example if the latest transmission has failed the contention window size may be doubled, otherwise it is reset to its minimum value. Another triggering mechanism to adjust the LBT parameters such as the contention window can be based on the communication channel occupancy being observed at the radio network access node. If the channel is observed to be occupied e.g. below or above a threshold, the contention window can be increased. WLAN and LAA operated from different nodes apply the corresponding triggering mechanism independently to adjust the respective LBT parameters. This operation can be adopted when both RATs are time-sharing. However since the transmission occurs from the same node, when the LTE bursts and WLAN TXOPs transmissions are time-shared, a common trigger mechanism can be used for both. The LBT parameters for each RAT are then updated independently.

In another embodiment, time sharing performed between LTE transmissions and WLAN transmissions is based upon numbers of associated wireless communication devices of different capabilities, LBT success/failure rate of each RAT, and relative traffic loads and QoS (Quality of Service) classes of traffic for each RAT.

In another embodiment, in case a wireless communication device supports both LTE and WLAN capabilities, the radio network access node may assign a selection probability to each configuration. On the basis of the selection probabilities, the radio network access node randomly selects one of the configurations as current operating one. The selection probabilities are adapted in a differentiated manner. Specifically, if the selection criterion is met by the current configuration, the selection probability of the current operating configuration may be incremented, while the selection probability of the other configuration is decremented. Further, if the selection criterion is not met by the current operating configuration, the selection probability of the current operating configuration may be decremented, while the selection probabilities of the other configuration are incremented. After adapting the selection probabilities, the radio network access node can randomly select a new configuration. Thereby, meeting the selection criteria will have a higher probability of being selected in future evaluations. As a non-limiting example, the selection criteria could be based on LBT success/failure rate.

In a further embodiment, radio network access node can operate in TDM (Time Division Multiplexing) mode between LTE and WLAN, with four types of subframe groups—LTE DL, LTE UL, WLAN DL, and WLAN UL. The radio network access node can signal the subframe configuration in advance for the wireless communication devices. The radio network access node can then decide on the subframe configuration based on predefined/or adaptive rules, e.g. in order to insure efficient wideband operation. As an example, the wireless communication device can be configured to transmit UL data on one configuration and receive DL data on another (e.g. wireless communication device can receive DL on LTE and transmit on the WLAN UL portion).

Thus, various solutions are provided for unlicensed spectrum sharing between WLAN and LTE. The sharing can be across frequency and/or across time. According to an embodiment, a radio network access node with both LTE and WLAN capabilities aggregates LTE component carriers and WLAN channels in parallel for data transmission. In another embodiment, time sharing is performed between LTE transmissions and WLAN transmissions on the same unlicensed channel or set of adjacent unlicensed channels. It is to be understood that LTE and LTE are in the above only for the sake of clarity mentioned in the place of a first radio access technology and that WLAN is also only by way of example used in the place of a second radio access technology.

Figure 13:
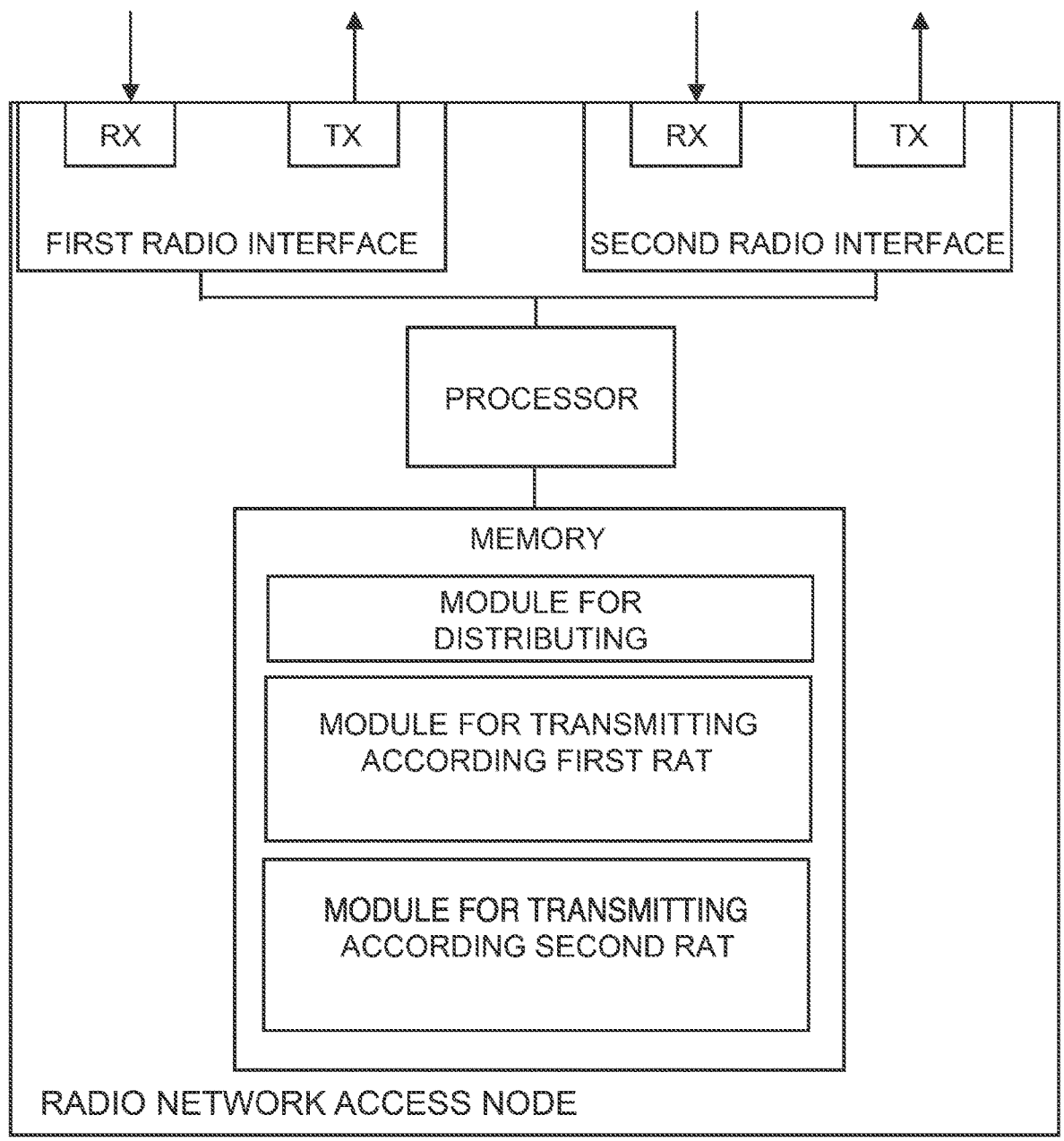
FIG. 13 schematically illustrates exemplary structures for implementing the above-described concepts in radio network access node.

Now referring to FIG. 13, exemplary structures for implementing the above-described concepts in a radio network access node are schematically illustrated.

In the illustrated structure, the radio network access node includes a first radio interface capable of a first radio access technology for performing data transmission via a first communication channel to and/or from a wireless communication device. The radio network node may also include a second radio interface capable of a second radio access technology for performing data transmission via a second communication channel to and/or from a wireless communication device (this may be the same or another wireless communication device). It is to be understood that a single radio interface capable of the first and the second radio access technology may nonetheless be sufficient.

The modules as depicted in FIG. 13 and as described in the following may be distributed on several network nodes and do not have to be present in a single node. For example the module for distributing, the module for transmitting according to the first and/or second RAT may be located in separate (logical) network nodes and/or devices and may only be operatively connected to each other.

Nonetheless, it is to be understood that for implementing transmitter (TX) functionalities the radio interfaces may include one or more transmitters, and that for implementing receiver functionalities (RX) functionalities the radio interfaces may include one or more receivers. Further, the radio network access node includes a processor and a memory coupled to the processor and optionally coupled to the first and second radio interface. The memory may include a ROM, e.g., a flash ROM, a RAM, e.g., a DRAM or SRAM, a mass storage, e.g., a hard disk or solid state disk, or the like. The memory includes suitably configured program code to be executed by the processor so as to implement the above-described functionalities of the radio network access node. More specifically, the memory may include a module for accomplishing the provision of: (Initiate) distributing of data packets. Further, the memory may also include a module for (initiating) transmission of according to a first RAT. In particular, the memory may also include a module for (initiating) transmission of according to a second RAT. However, the two modules for (initiating) transmission may be combined to form a single module.

It is to be understood that the structure as illustrated in FIG. 13 is merely schematic and that the radio network access node may actually include further components which, for the sake of clarity, have not been illustrated, e.g., further interfaces or additional processors. Also, it is to be understood that the memory may include further types of program code modules, which have not been illustrated. For example, the memory may include program code modules for implementing typical functionalities of a radio network access node or program code of one or more applications to be executed by the processor. According to some embodiments, also a computer program product may be provided for implementing concepts according to embodiments disclosed herein, e.g., a computer-readable medium storing the program code and/or other data to be stored in the memory.

The radio network access node may further comprise one or modules, not shown, for carrying out the embodiments as described with regard to FIGS. 1 to 12.

Figure 14:
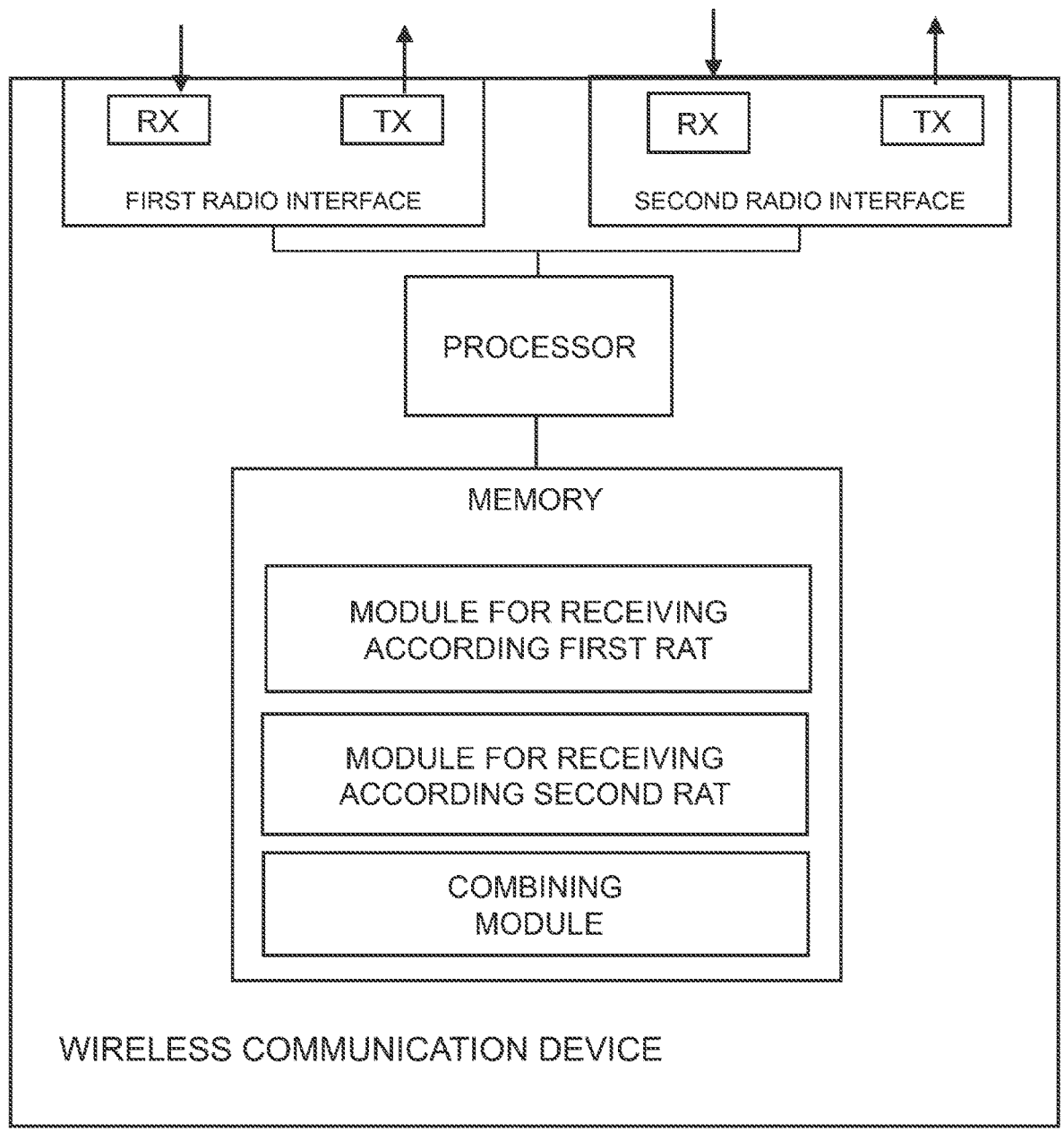
FIG. 14 schematically illustrates exemplary structures for implementing the above-described concepts in a wireless communication device.

Now referring to FIG. 14, exemplary structures for implementing the above-described concepts in the first wireless communication device are schematically illustrated. In the illustrated structure, the first wireless communication device includes a first and a second radio interface for performing data transmission to and/or from the radio network access node via the first and/or second communication channel according to the first and second RAT respectively. The wireless communication device may include a single radio interface only for performing data transmission from and/or to the radio network access node.

It is to be understood that for implementing transmitter (TX) functionalities the radio interfaces may include one or more transmitters, and that for implementing receiver functionalities (RX) functionalities the radio interface may include one or more receivers.

Further, the wireless communication device includes a processor coupled to the first and/or second radio interface and a memory coupled to the processor. The memory may include a ROM, e.g., a flash ROM, a RAM, e.g., a DRAM or SRAM, a mass storage, e.g., a hard disk or solid state disk, or the like. The memory may include suitably configured program code to be executed by the processor so as to implement the above-described functionalities of the wireless communication device. More specifically, the memory may include a module for accomplishing provision of: (initiating) reception according to a first RAT. Further the memory may include a module for accomplishing provision of: (initiating) reception according to a second RAT. Both modules can also be combined to form a single module.

It is to be understood that the structure as illustrated in FIG. 14 is merely schematic and that the wireless communication device may actually include further components which, for the sake of clarity, have not been illustrated, e.g. further interfaces or additional processors. Also, it is to be understood that the memory may include further types of program code modules, which have not been illustrated. For example, the memory may include program code modules for implementing typical functionalities of a wireless communication device or program code of one or more applications to be executed by the processor. According to some embodiments, also a computer program product may be provided for implementing concepts according to embodiments disclosed herein, e.g., a computer-readable medium storing the program code and/or other data to be stored in the memory.

The wireless communication device may further comprise one or more modules, e.g. in said memory, for carrying out any one of the embodiments as described with regards to FIGS. 1 to 12.

The invention claimed is:

1. A method of wireless communication via a first and a second communication channel in an unlicensed frequency band shared between a first and second radio access technology comprising:

a radio network access node distributing first data packets for transmission to a wireless device via the first communication channel and distributing second data packets for transmission to the wireless device via the second communication channel, the radio network access node transmitting to the wireless device the first data packets via the first communication channel according to the first radio access technology in said unlicensed frequency band, wherein said first radio access technology employs a synchronous access scheme, the radio network access node transmitting to the wireless device the second data packets via the second communication channel according to the second radio access technology in said unlicensed frequency band, wherein the second radio access technology differs from the first radio access technology, wherein said second radio access technology employs an asynchronous access scheme, and the radio network access node transmitting to the wireless device control information and resource allocation grants for the first communication channel via the second communication channel.

2. The method according to claim 1, said first radio access technology and said second radio access technology employing a listen-before-talk access-scheme.

3. The method according to claim 1, further comprising:
the radio network access node simultaneously transmitting to the wireless device data packets via the first and the second communication channels in said unlicensed frequency band.

4. The method according to claim 3, said first communication channel using resources in a first frequency region of the unlicensed frequency band and said second channel using resources in a second frequency region of the unlicensed frequency band, said first and second frequency regions being non-overlapping.

5. The method according to claim 1, further comprising:
the radio network access node subsequently transmitting to the wireless device other data packets via the first and the second communication channels in said unlicensed frequency band.

6. The method according to claim 5, said first communication channel using resources in a first frequency region of the unlicensed frequency band and said second channel using resources in a second frequency region of the unlicensed frequency band, said first and second frequency regions being overlapping.

7. The method according to claim 1, wherein the radio network node distributing the first data packets and the second data packets comprises the radio network access node distributing the first data packets for transmission to the wireless device via the first communication channel and distributing the second data packets for transmission to the wireless device via the second communication channel dependent on an amount of unsuccessful transmission of data packets via the first and/or second radio access technology.

8. A computer program product comprising program code to be executed by a processor of a radio network access node, thereby configuring the node to operate in accordance with a method as defined by claim 1.

9. The method according to claim 1, the radio network access node distributing the first data packets for transmission to the wireless device via the first communication channel and distributing the second data packets for transmission to the wireless device via the second communication channel dependent on a number of wireless communication devices associated with the radio network access node.

10. The method according to claim 1, further comprising:
transmitting to the wireless device control information and resource allocation grants for the second communication channel via the first communication channel.

11. A method of wireless communication via a first and a second communication channel in an unlicensed frequency band shared between a first and second radio access technology comprising:

a wireless communication device receiving from a radio network access node first data packets via the first communication channel according to the first radio access technology in said unlicensed frequency band, wherein said first radio access technology employs a synchronous access scheme, the wireless communication device receiving from the radio network access node second data packets via the second communication channel according to the second radio access technology in said unlicensed frequency band, wherein the second radio access technology differs from the first radio access technology, wherein said second radio access technology employs an asynchronous access scheme, the wireless communication device combining the first and second data packets received from the radio network access node via the first and the second communication channel, and the wireless communication device receiving from the radio network access node control information and resource allocation grants for the first communication channel via the second communication channel.

12. The method according to claim 11, said first radio access technology and said second radio access technology employing a listen-before-talk access-scheme.

13. The method according to claim 11, further comprising:
the wireless communication device simultaneously receiving from the radio network access node the first and the second data packets via the first and the second communication channel in said unlicensed frequency band.

14. The method according to claim 13, said first communication channel using resources in a first frequency region of the unlicensed frequency band and said second channel using resources in a second frequency region of the unlicensed frequency band, said first and second frequency regions being non-overlapping.

15. The method according to claim 11, further comprising:
the wireless communication device subsequently receiving from the radio network node other data packets via the first and the second communication channel in said unlicensed frequency band.

16. The method according to claim 15, said first communication channel using resources in a first frequency region of the unlicensed frequency band and said second channel using resources in a second frequency region of the unlicensed frequency band, said first and second frequency regions being overlapping.

17. The method according to claim 11, further comprising:
wherein the wireless communication device receiving the first data packets and the second data packets comprises the wireless communication device receiving from the radio network access node the first and the second data packets distributed on the first and the second communication channel dependent on an amount of unsuccessful transmission of data packets via the first and/or second radio access technology.

18. A computer program product comprising program code to be executed by a processor of a wireless communication device, thereby configuring the wireless communication device to operate in accordance with a method as defined by claim 11.

19. The method according to claim 11, the wireless communication device receiving from the radio network access node the first and the second data packets distributed on the respective first and the second communication channel dependent on a number of wireless communication devices associated with the radio network access node.

20. The method according to claim 11, further comprising:
receiving from the radio network access node control information and resource allocation grants for the second communication channel via the first communication channel.

21. A radio network access node for wireless communication via a first communication channel and a second communication channel in a frequency band shared between a first radio access technology and a second radio access technology, the radio network access node operative to:
distribute first data packets for transmission to a wireless device via the first communication channel and distribute second data packets for transmission to the wireless device via the second communication channel,
transmit to the wireless device the first data packets via the first communication channel according to the first radio access technology in said unlicensed frequency band, wherein said first radio access technology employs a synchronous access scheme,
transmit to the wireless device the second data packets via the second communication channel according to the second radio access technology in said unlicensed frequency band, wherein the second radio access technology differs from the first radio access technology, wherein said second radio access technology employs an asynchronous access scheme, and
transmit to the wireless device control information and resource allocation grants for the first communication channel via the second communication channel.

22. The radio network access node according to claim 21, comprising at least one interface and at least one processor, wherein the at least one processor is configured to distribute the first and second data packets for transmission to the wireless device, and to transmit via the at least one interface the first and second data packets according to the first and/or second radio access technology.

23. A wireless communication device for wireless communication via a first and a second communication channel in an unlicensed frequency band shared between a first and second radio access technology, the wireless communication device operative to:
receive from a radio network access node first data packets via the first communication channel according to the first radio access technology in said unlicensed frequency band, wherein said first radio access technology employs a synchronous access scheme,
receive from the radio network access node second data packets via the second communication channel according to the second radio access technology in said unlicensed frequency band, wherein the second radio access technology differs from the first radio access technology, wherein said second radio access technology employs an asynchronous access scheme,
combine the first and the second data packets received via the first and the second communication channels, and
receive from the radio network access node control information and resource allocation grants for the first communication channel via the second communication channel.

24. The wireless communication device according to claim 23, comprising at least one interface and at least one processor, wherein the at least one processor is configured to receive from the radio network access node the first and the second data packets according to the first and second radio access technology via the at least one interface, and to combine the received first and second data packets.

* * * * *